United States Patent [19]
Guilford et al.

[11] Patent Number: 5,455,847
[45] Date of Patent: Oct. 3, 1995

[54] CLOCK RECOVERY PHASE DETECTOR

[75] Inventors: John H. Guilford, Everett; Howard E. Hilton, Snohomish, both of Wash.

[73] Assignee: Hewlett-Packard Company, Palo Alto, Calif.

[21] Appl. No.: 911,860

[22] Filed: Jul. 10, 1992

[51] Int. Cl.⁶ .................................................. H03D 3/24
[52] U.S. Cl. ...................... 375/373; 375/326; 327/159; 327/299; 327/350
[58] Field of Search ........................... 375/118–120, 326, 375/373–376; 331/25; 328/133, 135, 144, 145, 151, 155; 307/262, 490, 492; 364/748.5

[56] References Cited

U.S. PATENT DOCUMENTS

| | | | |
|---|---|---|---|
| 4,344,176 | 8/1982 | Qureshi | 375/15 |
| 4,376,309 | 3/1983 | Fenderson et al. | 375/101 |
| 4,416,017 | 11/1983 | Jasper et al. | 375/99 |
| 4,675,881 | 6/1987 | Chung | 375/78 |
| 4,727,508 | 2/1988 | Williams | 364/748.5 |
| 4,794,624 | 12/1988 | Braun et al. | 328/151 |
| 4,805,191 | 2/1989 | Burch et al. | 375/11 |
| 4,910,465 | 3/1990 | Dillman | 328/145 |
| 5,001,724 | 3/1991 | Birgenheier et al. | 375/10 |
| 5,036,296 | 7/1991 | Yoshida | 331/17 |

OTHER PUBLICATIONS

IEEE Transactions on Communication Technology, vol. 33, No. 6/1/85, pp. 558–568.
Oscar Agazzi, et al, 'Timing recovery in digital subscriber loops', p. 559, col. 1, line 41, p. 560, col. 2, line 32, p. 565, col. 1, line 14–line 46.
Birgenheier et al., U.S. Patent Application Serial No. 07/559,313, filed Jul. 30, 1990, entitled "Method and Apparatus for Measuring Modulation Accuracy".
IEEE Network: The Magazine of Computer Communications; vol. 5 No. 6, Nov. 1, 1991 pp. 39–43; Krzytof Duch 'Baseband signal processing' p. 42, col. 1, line 12–43, col. 1, line 11.
Pp. 39–43; Krzytof Duch 'Baseband signal processing'p. 42, col. 1, line 12–p. 43, col. 1, line 11.
Pending U.S. Application Serial No. 07/559,313 of Birgenheier, et al., filed Jul. 30, 1990.
Birgenheier, *Technique for Measuring Phase Accuracy and Amplitude Profile of Continuous–Phase–Modulated Signals*, Hewlett Packard, 1989.
"Reference Data for Engineers", 1968, 1975, 1985 by SAMS, pp. 15-6, 15-7.

*Primary Examiner*—Stephen Chin
*Assistant Examiner*—Amanda T. Le

[57] ABSTRACT

A phase detector for symbol clock recovery in a digital communications system determines the phase error of a local symbol clock from the symbol rate of a transmitted signal by sampling the transmitted signal to obtain a first sample at a fraction of a symbol period after the symbol clock and to obtain a second sample at an equal fraction of a symbol period before the symbol clock, and determining a phase error equal to the difference between a function of the magnitude of the first sample and a function of the magnitude of the second sample. The function is preferably the square of the magnitude or the logarithm of the magnitude of the samples.

12 Claims, 3 Drawing Sheets

CLOCK RECOVERY PHASE DETECTOR

FIELD OF THE INVENTION

The present invention relates to digital communication systems, and more particularly relates to a method and apparatus for recovering a symbol clock from a transmitted digital communication signal.

BACKGROUND AND SUMMARY OF THE INVENTION

Numerous systems for digital communications are known and transmit digital data using a-variety of techniques. The particular technique used by a system determines how data is encoded in a transmitted signal and how the data may be decoded by a receiver of the transmitted signal. Regardless of the particular technique used, it is generally necessary for the receiver of the transmitted signal to reconstruct a clock signal corresponding to a clock signal by which the information was sent. Reconstructing the correct clock is sometimes complicated by the fact that the information in the transmitted signal may be valid at only one instant in the clock cycle.

In general, digital communications systems send information in units called symbols. For each symbol, a band-limited waveform is transmitted. These waveforms are transmitted at a certain rate (the symbol rate) by the system. However, because the waveforms are band-limited, they typically have a duration of much longer than one symbol period. Thus, at any particular time, a signal sent by the system is the sum of a large number of these waveforms. However, as long as the transmitted waveforms have periodic zero crossings at the symbol rate, it is still possible to decode the symbols. Decoding of the symbols becomes a matter of determining when to sample the transmitted signal so that the transmitted signal includes only the information from one symbol, or, at the least, so that the interference from the other symbols is minimized. In other words, to decode a symbol, a receiver must generate a symbol clock for sampling the transmitted signal at times which minimizes interference from other symbols.

When a transmitted waveform has periodic zero crossings at the symbol rate, the transmitted signal contains the waveform of only one symbol at a particular time during a symbol period. For example, if the waveform for a symbol, s, is s*h(t), and the symbol rate is one symbol every T seconds, then the transmitted signal, x, is given by the following equation:

$$x(t) = \Sigma s(i) * h(t-iT) \quad (1)$$

If the waveform has periodic zero crossings at the symbol rate, then h(t) is such that:

$$h(t) = 0 \text{ for } t = n*T \text{ (n=integer} \neq 0) \quad (2)$$

Then, at the times t=nT, the transmitted signal, x(t), contains only contributions from one symbol, s(n). By sampling the transmitted signal at these times, the symbols may be correctly decoded.

The problem of symbol clock recovery may be further complicated by the fact that the transmitted signal may still contain some of the carrier during decoding of the symbols. More particularly, instead of receiving the transmitted signal, x(t), the receiver may receive the signal, x(t)*exp(-jwt+p), where w and p are unknown and possibly varying.

Previous implementations of digital communications systems solve the symbol clock recovery problem in different ways. Typically, the solution involves some feature of the specific system. For example, some systems start up with, or periodically insert, known symbol patterns. Receivers for these systems "look" for the known pattern and use that information to "sync up" a local oscillator which generates the symbol clock sample times. Receivers in other systems look for particular zero crossings of the transmitted signal and generate the timing data therefrom. A disadvantage to most current systems is that their receivers depend on some characteristic of the particular communication scheme to generate a symbol clock. Hence, the receivers will not work if employed for a different communication scheme. One object of the present invention, therefore, is to provide a technique for generating a symbol clock that is compatible with a very large number of different communications systems.

In at least one digital communications system, the receiver contains a phase detector which looks at the magnitude of the real and imaginary parts of the transmitted signal at times ¼ of a symbol period away from a symbol clock sample time. The phase detector is used to synchronize a synthesized clock signal to the symbol rate of the transmitted signal. However, since such a system does not compare the magnitude of the transmitted signal itself before and after a symbol clock sample time, its phase detector is affected by any carrier that is left in the transmitted signal and may be inaccurate. An example of such a system is the STEL-2110A chip manufactured by Stanford Telecom.

The present invention is based on principles described in the attached appendix A, a paper entitled "Clock Recovery Phase Detector". As is derived in the appendix, the expected value of the magnitude squared of the transmitted signal varies sinusoidally with a period of the sample rate. This sinusoid has a maximum at the correct sample times and a minimum ½ way between the correct sample times. Therefore, the correct sample times of the symbol clock can be found by locating the maximums of the squared magnitude of the transmitted signal.

In accordance with the present invention, the problem of symbol clock recovery is solved by providing a phase detector for synchronizing a symbol clock with the maximums of the squared magnitude of the transmitted signal. The phase detector compares the squared magnitude of the transmitted signal at times spaced an equal fraction of a symbol clock period away from symbol clock sample times and produces a phase error signal proportional to the difference between the magnitude squared of the transmitted signal at such times. For example, a phase detector according to the present invention may sample the transmitted signal at times one quarter and three quarters of a symbol period before a symbol clock sample time. The phase error signal generated by the phase detector may be expressed mathematically as follows:

$$\text{phase error} = |x(t-T/4)|^2 - |x(t-3T/4)|^2 \quad (3)$$

where $|X|^2$ means the magnitude squared, or x times the complex conjugate of x; t is a symbol clock sample time; and T is the symbol period.

The comparison of magnitudes squared allows the phase detector to determine if the symbol clock frequency is synchronized with the symbol rate of the transmitted signal. If the magnitude squared of the transmitted signal at these times is equal, the symbol clock is synchronized. If the magnitude squared at these times differs, the symbol clock is out of phase. By connecting the phase detector in a phase-locked loop configuration with the symbol clock generator, the phase error signal can serve as a feedback signal for adjusting the frequency of the symbol clock to be synchronous with the symbol rate of the transmitted signal.

The phase detector described above has two drawbacks: (1) the gain of the phase detector is related to the level of the transmitted signal, and (2) because of the magnitude squared function, twice as many bits of precision are needed in the calculation as compared with a straight magnitude based system. Thus, to function adequately, some form of automatic gain control would be necessary to keep the level of the transmitted signal constant. However, another modification to the phase detector eliminates both these problems. The modified phase detector takes the logarithm of the magnitude of the transmitted signal at times spaced an equal fraction of a symbol period away from the sample times rather than the magnitude squared. Thus, the phase error signal may be expressed as follows:

$$\text{phase error} = \log(|x(c-T/4)|) - \log(|x(c-3T/4)|) \quad (4)$$

where the vertical bars (||) denote magnitude, and the log may be in any convenient base. The advantage of using the logarithm of the magnitude function rather than the magnitude squared function is that the phase error signal is not dependent on the gain of the transmitted signal. Also, the logarithm function decreases the number of bits of precision required in the phase detector. A further advantage to using the logarithm function instead of the magnitude squared function is that the signal to noise ratio is increased.

Additional features and advantages of the invention will be made apparent from the following description of the preferred embodiment, which proceeds with reference to the accompanying drawings.

DETAILED DESCRIPTION OF THE PREFERRED EMBODIMENT

Figure 1:
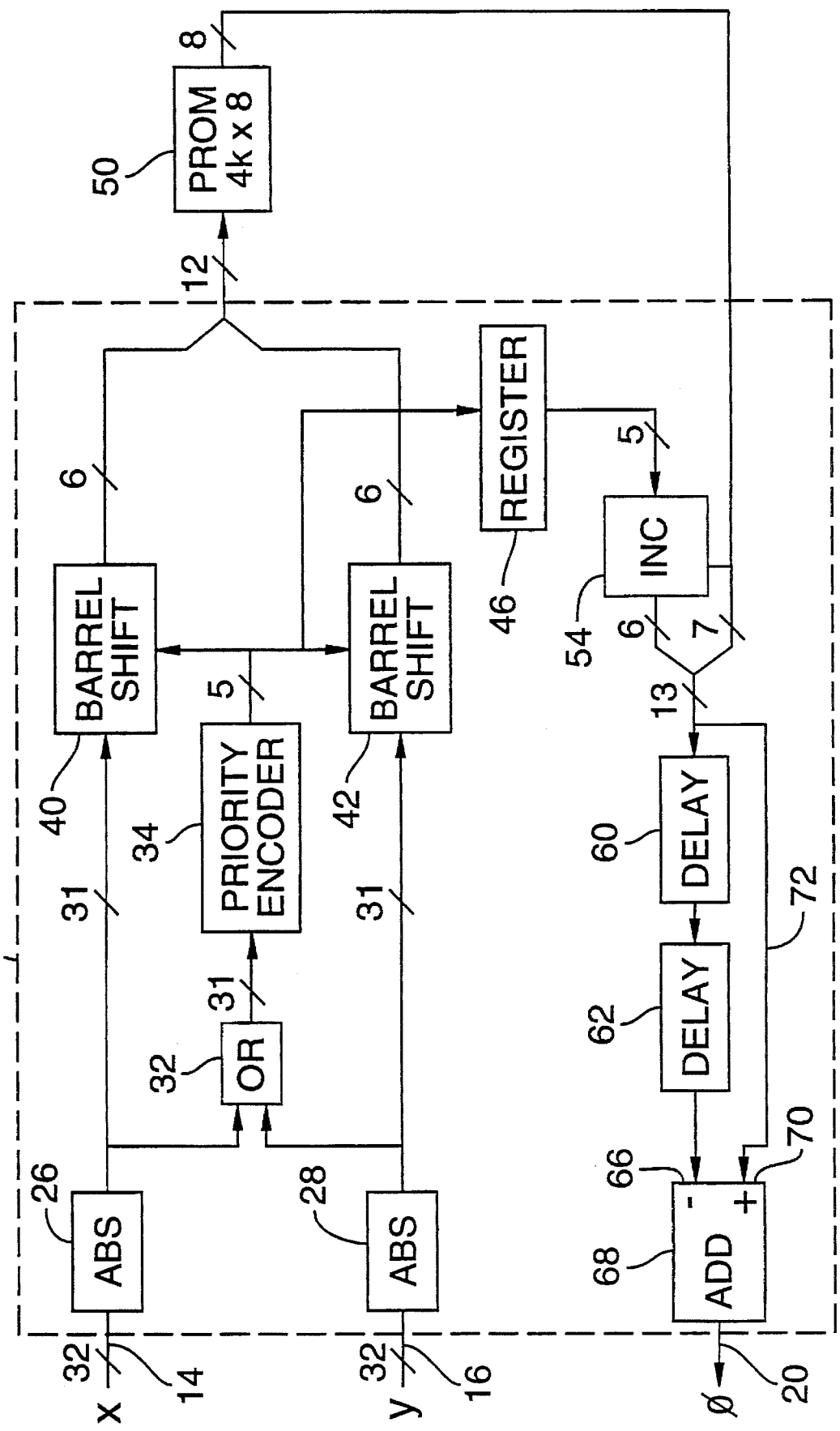
FIG. 1 is a block diagram of a phase detector according to a preferred embodiment of the invention.

With reference to FIG. 1, a phase detector 10, in accordance with a preferred embodiment of the present invention, receives samples of the real and imaginary components of a transmitted signal at inputs 14 and 16 respectively. The samples are taken at times one quarter and three quarters of a sample period before a symbol clock sample time. The samples are 32 bit digital values. From the samples, the phase detector generates a phase error signal at an output 20 related to the transmitted signal in accordance with equation (4) above.

The first step in generating the phase error signal is to take the absolute value of the real and imaginary components. Two absolute value logic circuits 26, 28 in the phase detector 10 determine the absolute value of each component by performing an XOR of the 32 bit value with its sign bit. The result of the XOR operation is a 31 bit absolute value which may differ from the actual absolute value in its least significant bit. However, this error is negligible in this application.

The second step is to left-shift the bits in the real and imaginary absolute values until one of the values has a "1" in its most significant bit. An OR logic gate 32 and a priority encoder 34 locate the bit position of the first (most significant) "1" bit in either the real or imaginary absolute values. The OR logic gate 32 combines the two 31-bit absolute values using the OR logic function. The priority encoder determines a number of bit positions between the most significant bit and the first "1" bit in the combined value. This number is the number of bit shifts to be performed and is represented as a 5-bit digital value. Two barrel shifters 40, 42 shift the bits of the absolute values leftward (towards the most significant bit) by the number of bit shifts determined by the priority encoder 34. The 5-bit, bit shift number is stored in a register 46.

Next, the phase detector 10 uses a table look-up ROM 50 to obtain the value of the logarithm of the magnitude squared. The phase detector 10 takes the six most significant bits of each shifted absolute value to form a 12-bit address. The six most significant bits of the shifted absolute real value become the six most significant bits of the address while the six most significant bits of the shifted absolute imaginary value become the six least significant bits. Using the 12-bit address, the phase detector 10 accesses an 8-bit value in the ROM 50. Preferably, the ROM 50 is implemented with a 4k×8 bit PROM which provides the $2^{12}$ addressable locations that can be accessed with a 12-bit address. Each address in the ROM 50 is programmed with an 8-bit value equal to $\log_2(A^2+B^2)$ where A is a value equal to the six most significant bits of the address and B is a value equal to the six least significant bits of the address.

Although six bits of each shifted absolute component value are taken to form the look-up address in the preferred embodiment, it will be readily apparent to one skilled in the art that any number of bits, N, may be taken. The size and programming of the ROM 50 must be varied accordingly to provide $2^{2N}$ addressable locations, each containing a sufficient number of bits to represent $\log_2(A^2+B^2)$ where A is a value equal to the N most significant bits of the address and B is a value equal to the N least significant bits of the address.

It is also possible to reduce the size of the ROM 50 based on the fact that, in the preferred embodiment of the phase detector 10, the most significant bit of one of the shifted absolute values is known to equal "1". Thus, the N most significant bits of the address can be selected from the shifted absolute real value when the shifted absolute real value has a "1" as its most significant bit, or from the shifted absolute imaginary value when the shifted absolute real value does not have a "1" as its most significant bit. This serves to guarantee that the most significant bit of the address is a "1". With the most significant bit of the address always equal to "1", it may be dropped from the address, reducing the size of the ROM to $2^{2n-1}$ addressable locations.

To complete the logarithm value determination, the 8-bit output value is added to twice the bit shift number. This summation is performed with an incrementer 54. The incrementer 54 adds the most significant bit of the 8-bit ROM output value to the 5-bit shift number. The result of this summation are six bits which become the six most significant bits of a thirteen bit logarithm value. The seven least significant bits of the 8-bit ROM output value become the seven least significant bits of the logarithm value.

The steps described above are performed by the phase detector twice during each sample period. The steps are performed first on a sample (with real and imaginary components) of the transmitted signal taken at three quarters of a sample period before the symbol clock sample time. As a result, the phase detector generates a "minus three quarters" logarithm value. When the phase detector performs the steps a second time, a sample of the transmitted signal taken at one quarter of a sample period before the symbol clock sample time is used to produce a "minus one quarter" logarithm value.

In the final step, the phase detector 10 subtracts the "minus three quarters" logarithm value from the "minus one quarter" logarithm value to yield a phase error signal. The "minus three quarters" logarithm value is determined first. Therefore, this logarithm value must be delayed until the "minus one quarter" logarithm value is determined. Two delay latches 60, 62 delay the "minus three quarters" logarithm value by a quarter sample period each before the value is presented at a first input 66 of an adder 68. By the time the "minus three quarters" logarithm value arrives at the adder, the "minus one quarter" logarithm value will be determined and arrive simultaneously at a second input 70 along the path 72. When both logarithm values have arrived, the adder 68 subtracts the "minus three quarters" logarithm value from the "minus one quarter" logarithm value. From this subtraction, the adder 68 generates the phase error signal which is presented at the output 20 of the phase detector 10.

Figure 2:
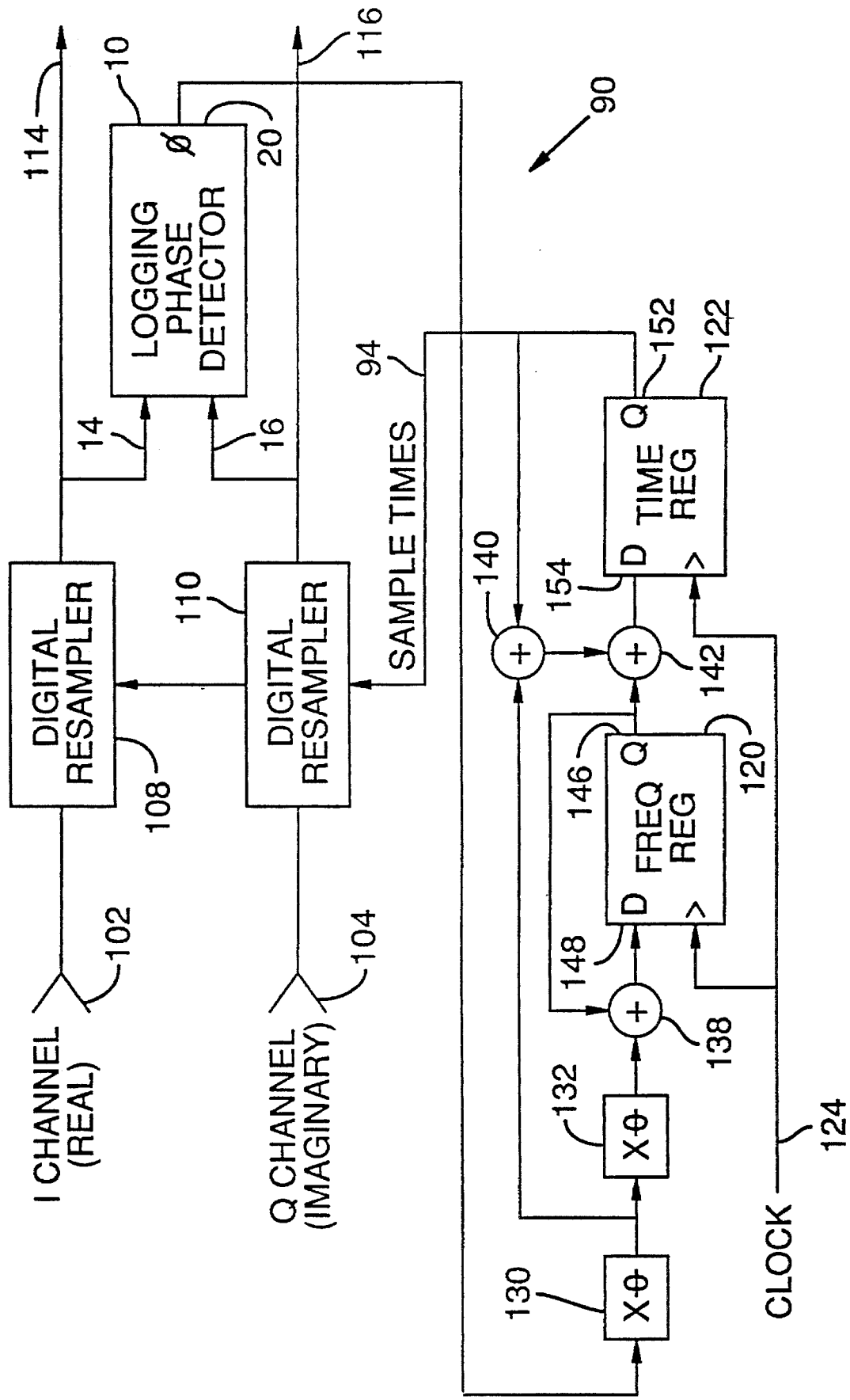
FIG. 2 is a block diagram of the phase detector shown in FIG. 1 in a second order phase locked loop.

Referring to FIG. 2, the phase detector 10 can be used in a phase locked loop 90 to properly synchronize a symbol clock signal 94 to the symbols in a transmitted signal from a digital communication system. The phase locked loop 90 is a component part of a conventional digital communications receiver (not shown) whose purpose is to receive the transmitted signal and decode symbols modulated on the transmitted signal. The receiver receives and separates the transmitted signal into a real component signal and an imaginary component signal. The receiver presents the real component signal at an I-channel input 102 to the phase locked loop 90. The imaginary component signal is presented at a Q-channel input 104.

The channel inputs 102, 104 are connected to digital resamplers 108, 110. The digital resamplers are clocked by the symbol clock signal 94 to sample the real and imaginary component signals at symbol clock sample times. The symbol clock sample times are times at which a symbol can be decoded with minimal interference from other symbols. The samples of the real and imaginary components at the symbol clock sample times are provided to the receiver for decoding of the symbol at outputs 114 and 116 respectively. The symbol clock signal 94 also clocks the digital resamplers to sample the real and imaginary component signals at times one quarter and three quarters of a sample period before a symbol clock sample time. These samples are provided to the logging phase detector 10 at inputs 14 and 16. With the samples, the logging phase detector 10 generates the phase error signal at its output 20 as described above.

The remainder of the phase locked loop 90 has the structure of a conventional second order phase locked loop. This structure includes a frequency register 120 and a time register 122 which regulate the symbol clock signal 94. The frequency and time registers 120, 122 are implemented with D flip-flops. The registers are each clocked with a local clock signal 124. The phase error signal from the phase detector 10 provides a feedback to the registers for adjusting the symbol clock signal 94.

The phase error signal drives scaling circuits 130 and 132 which multiply the phase error signal by a constant, $\epsilon$. The constant, $\epsilon$, is such that:

$$\epsilon = 2^{-n} < 1 \qquad (5)$$

which allows the multiplication to be performed on a digital value by simply right-shifting the bits by n bit positions.

Adders 138, 140, 142 complete the phase locked loop 90. The adders 138–142 are connected to provide feedback of each register's 120, 122 output to its input. More specifically, adder 138 sums the scaled phase error signal from the scaling circuit 132 with an output from a Q output 146 of the frequency register 120, and provides the sum to a D input 148 of the frequency register. The adders 140 and 142 sum an output from a Q output 152 of the time register 122, the scaled phase error signal from the scaling circuit 130, and the output of the frequency register 120. This sum is provided at a D input 154 of the time register 122.

In the preferred embodiment of the phase detector 10, the phase error signal is determined on the basis of a logarithm function according to equation (4) above. In other embodiments of the invention, a phase detector may be provided that determines a phase error signal based on the magnitude squared function as given by equation (3) above. However, the preferred embodiment which utilizes the logarithm function provides certain advantages over embodiments based on the magnitude squared function.

One advantage to using the logarithm function instead of the magnitude squared function in the phase detector is that the signal to noise ratio is increased. An increased signal to noise ratio in a phase detector means increased performance. A measure of the signal to noise ratio is the peak-to-peak variation of the ensemble average of the function divided by the DC value. Thus, the signal to noise ratios available through the two functions may be compared by examining their ensemble averages.

As derived in the attached appendix A, the ensemble average of the magnitude squared function is:

$$E\{|x(t)|^2\} = A + B\cos(2\pi t/T) \qquad (6)$$

In equation (6), since the magnitude squared is always non-negative, its expected value must be non-negative. Thus, it follows that A must be greater than B.

Figure 3:
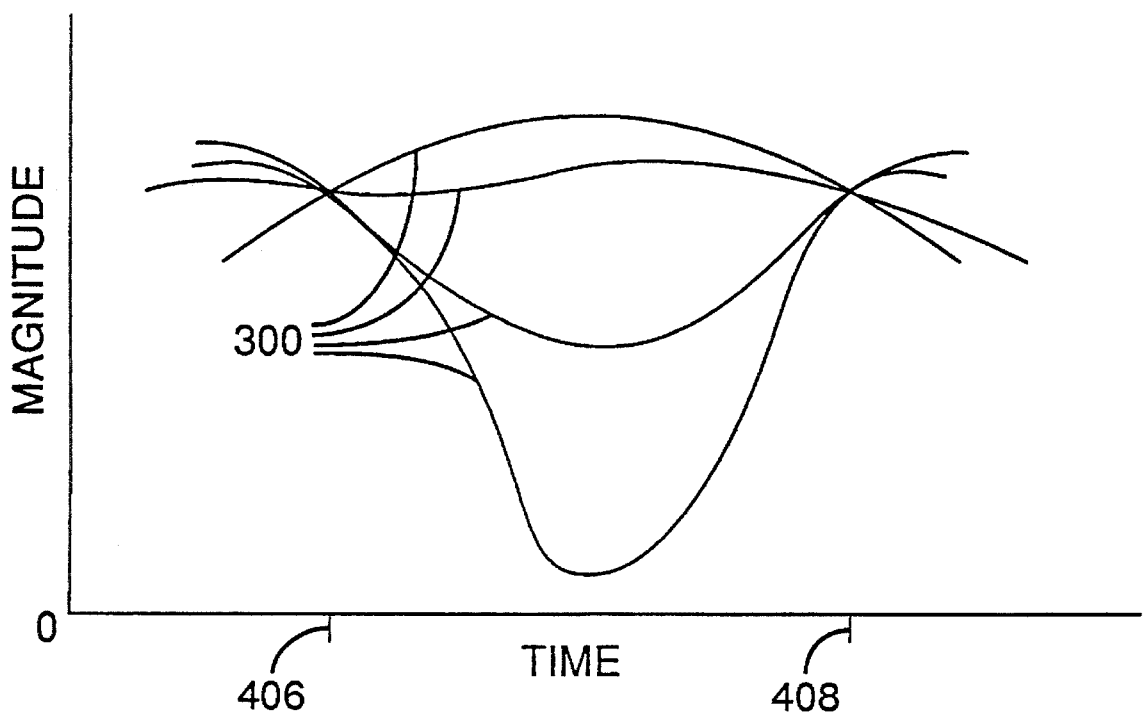
FIG. 3 is a waveform diagram showing exemplary waveforms in an ensemble of the magnitude squared of the transmitted signal.
Figure 4:
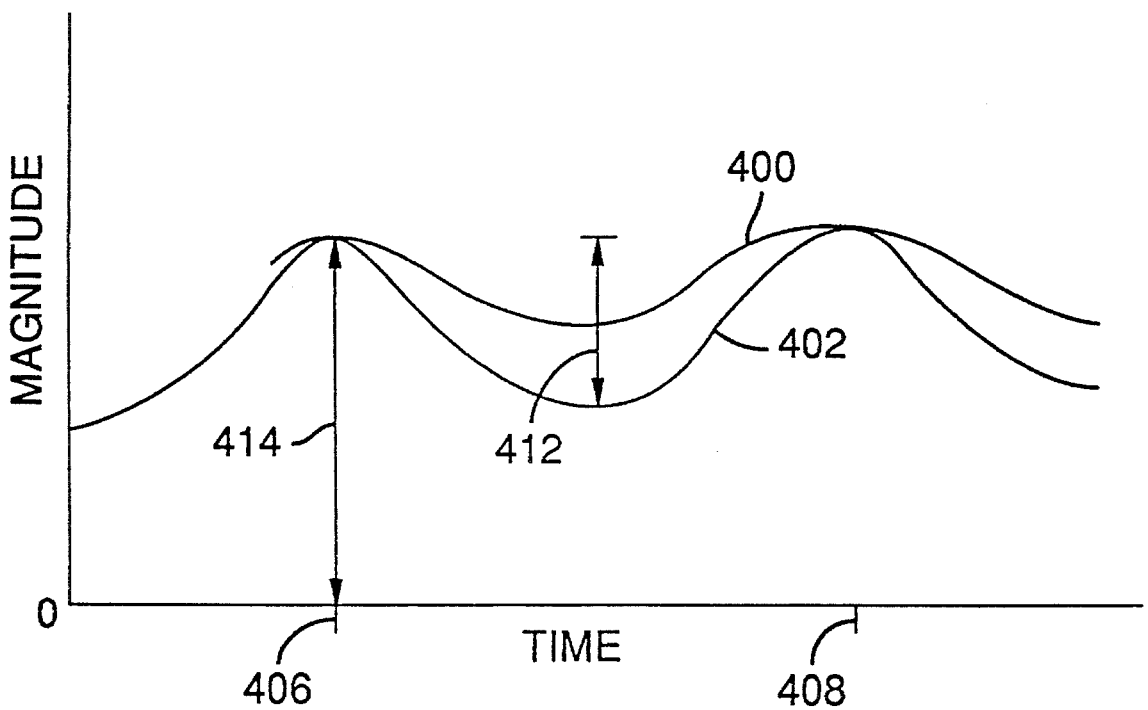
FIG. 4 is a waveform diagram showing the average of an ensemble of the waveforms of FIG. 3.

Referring to FIG. 3, a graph of the magnitude squared versus time of four waveforms 300 is shown. The four waveforms 300 are examples of waveforms in an ensemble of the magnitude squared of the transmitted signal, $|x(t)|^2$. The arithmetic or ensemble average 400 of the waveforms 300 is shown in FIG. 4.

To compare the ensemble averages of the magnitude squared and the logarithm functions, first consider the ensemble average of the logarithm of the magnitude squared function. From well known properties of the logarithm function, it can be shown that:

$$E\{\log(|x(t)|^2)\} = 2E\{\log(|x(t)|)\} \qquad (7)$$

Thus, the ensemble average of the logarithm function is related to the ensemble average of the logarithm of the magnitude squared function.

Taking the ensemble average of a logarithm function is equivalent to taking the logarithm of the geometric average of the logarithm function's operand. Thus, the ensemble average of the logarithm of the magnitude squared function is equivalent to the logarithm of the geometric average of the magnitude squared function. Then, from equation (7), it can be shown that the ensemble average of the logarithm function is related to the geometric average of the magnitude squared function.

The geometric average 402 of the example ensemble of the magnitude squared function is shown in FIG. 4. It can be shown that at the symbol clock sample times (t=nT), the transmitted signal (x(t)) equals the symbol value. Therefore, the geometric average 402 of the magnitude squared function at the symbol clock sample times 406, 408 equals the arithmetic average 400. Thus:

$$E\{\log(|x(nT)|^2)\}=\log[E\{|x(t)|^2\}] \quad (8)$$

This indicates that, at their maximum peak values, the ensemble average of the logarithm of the magnitude squared function equals the logarithm of the ensemble average of the magnitude squared function.

For times other than the symbol clock sample times (t<>nT), the geometric average 402 of the magnitude squared of the transmitted signal is less than or equal to its arithmetic average 400. Thus, $$E\{\log(|x(t)|^2)\} \leq \log[E\{|x(t)|^2\}] \quad (9)$$

with equality rarely occurring. The signal to noise ratio is the ratio of the peak to peak variation of the ensemble average of the function to the DC level. Thus, the signal to noise ratio of the logarithm function is related to the peak to peak variation 412 of the geometric average waveform 402 to its DC level 414. Since the peak values of the arithmetic and geometric averages are the same and the "dip" of the geometric average deeper, the signal to noise ratio of the logarithm function is higher than that of the magnitude squared function.

Having described and illustrated the principles of our invention with reference to an illustrative embodiment, it will be recognized that the invention can be modified in arrangement and detail without departing from such principles. Accordingly, we claim as our invention all such embodiments as may come within the scope and spirit of the following claims and equivalents thereto.

We claim:

1. A phase detector for detecting a phase difference between symbol clock sample times and transmitted signal symbol time comprising:

input means for receiving first and second samples of a transmitted data signal, the first sample taken a fraction of a symbol period after a symbol clock sample time, the second sample taken an equal fraction of a symbol period before a symbol clock sample time;

magnitude means coupled to the input means for producing first and second magnitude signals related to a logarithmic function of the magnitude of the first and second samples of the transmitted date signal; and difference means having an input coupled to an output of the magnitude means, for producing a phase difference signal corresponding to a difference between the first and second magnitude signals, the phase difference signal being related to the phase difference between symbol clock sample times and transmitted signal symbol times.

2. The phase detector of claim 1 wherein the magnitude means comprises:

a table look-up ROM programmed with a table of computed values of a function, the ROM returning a result value equal to a function of an address value when presented with the address value, the address value being related to the magnitude of the first and second samples.

3. The phase detector of claim 1 wherein the input means comprises:

a first input for receiving a real component of each of the first and second samples of the transmitted signal; and a second input for receiving an imaginary component of each of the first and second samples of the transmitted signal.

4. The phase detector of claim 3 wherein the magnitude means comprises:

a first XOR circuit for determining the absolute value of the real component of each sample by performing the XOR logic operation of the real component and its sign bit; and a second XOR circuit for determining the absolute value of the imaginary component of each sample by performing the XOR logic operation of the imaginary component and its sign bit.

5. The phase detector of claim 1 wherein the first sample is taken at one quarter of a symbol period after a first symbol clock sample time and the second sample is taken at one quarter of a symbol period before a second symbol clock sample time, the second symbol clock sample time occurring one symbol period after the first symbol clock sample time.

6. A phase detector as recited in claim 1 included within a phase locked loop for recovery of a symbol clock in a digital communications system, the phase locked loop comprising:

a sampler for taking first and second samples of a transmitted signal at first and second sample times respectively, the first sample time spaced a fraction of a symbol period before a symbol clock sample time, the second sample time spaced a fraction of a symbol period after a symbol clock sample time;

a symbol clock generator for producing a symbol clock with level transitions at symbol clock sample times; and a symbol clock phase control circuit responsive to the phase difference signal to control the phase of the symbol clock.

7. The phase detector of claim 1 comprising:

first and second inputs for receiving a real component and an imaginary component respectively of the first and second samples;

first and second XOR logic circuits connected to the first and second inputs respectively for forming absolute values of the real and imaginary components;

first and second barrel shifters for left-shifting bits of the absolute values by a number of left shifts necessary to shift the most significant one bit of the greater of the absolute values into its most significant bit;

a table look-up ROM programmed with a table of computed values of a logarithmic function, the ROM returning a result value equal to a logarithmic function of an address value related to the absolute values when presented with the address value;

a first adder circuit for adding the result value to the number of left shifts performed by the barrel shifter on the absolute values to form a logarithm of the magnitude value for each sample; and a second adder circuit for determining the difference between a logarithm of the magnitude value for the first sample and a logarithm of the magnitude value for the second sample.

8. A phase locked loop for recovery of a symbol clock in a digital communication system, comprising:

a sampler for taking first and second samples of a transmitted signal at first and second sample times respectively, the first sample time spaced a fraction of a symbol period before a symbol clock sample time, the second sample time spaced a fraction of a symbol period after a symbol clock sample time;

a phase detector connected to the sampler for determining a difference between a logarithmic function of the magnitude of each sample and for producing a phase error signal proportional to the difference; and a variable frequency symbol clock generator connected to the phase detector for producing a symbol clock signal with level transitions at symbol clock sample times and for adjusting the frequency of the symbol clock signal in accordance with the magnitude of the phase error signal.

9. The phase-locked loop of claim 8 wherein the phase detector comprises:

first and second inputs for receiving a real component and an imaginary component respectively of each sample from the sampler;

first and second XOR logic circuits connected to the first and second inputs respectively for forming absolute values of the real and imaginary components;

first and second barrel shifters for left-shifting bits of the absolute values by a number of left shifts necessary to shift the most significant one bit of the greater of the absolute values into its most significant bit;

a table look-up ROM programmed with a table of computed values of a function, the ROM returning a result value equal to a function of an address value related to the absolute values when presented with the address value;

a first adder circuit for adding the result value to the number of left shifts performed by the barrel shifter on the absolute values to form a logarithm of the magnitude value for each sample; and a second adder circuit for determining the difference between a logarithm of the magnitude value for the first sample and a logarithm of the magnitude value for the second sample.

10. A method of detecting the phase of a transmitted signal in a digital communications system to recover a symbol clock, comprising:

generating a symbol clock having transitions at symbol clock sample times;

sampling a transmitted signal at a first and a second sample time to form first and second samples respectively, the transmitted signal comprising a plurality of symbol waveforms, the first sample time occurring a fraction of a symbol period after a symbol clock sample time, the second sample time occurring an equal fraction of a symbol period before a symbol clock sample time;

determining a phase error equal to a difference between a logarithmic function of the magnitude of the first sample and a logarithmic function of the magnitude of the second sample; and adjusting the symbol clock sample times according to the amount of phase error until the phase error is nullified.

11. The method of claim 10 wherein the first and second samples each comprise real and imaginary components and the step of determining comprises:

finding an absolute value of the real and imaginary components of each sample;

determining a logarithm of the magnitude value for each sample with a table look-up ROM using a portion of the absolute value of the real and imaginary components as an address to the ROM;

subtracting to find the difference between the logarithm of the magnitude values of the first and second samples.

12. The method of claim 10 wherein the first sample time occurs one quarter of a symbol period after a first symbol clock sample time and the second sample time occurs one quarter of a symbol period before a second symbol clock sample time, the second symbol clock sample time occurring one symbol period after the first symbol clock sample time.

* * * * *